(12) United States Patent
Su et al.

(10) Patent No.: US 12,044,944 B2
(45) Date of Patent: Jul. 23, 2024

(54) ELECTRONIC PAPER AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shaokai Su, Beijing (CN); Liguang Deng, Beijing (CN); Gang Hua, Beijing (CN); Min Wang, Beijing (CN); Zhe Wang, Beijing (CN); Dong Wang, Beijing (CN); Shaobo Li, Beijing (CN); Meng Gong, Beijing (CN); Pengkai Fan, Beijing (CN); Jintang Hu, Beijing (CN); Liangliang Pan, Beijing (CN); Jinghao Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 385 days.

(21) Appl. No.: 17/376,213

(22) Filed: Jul. 15, 2021

(65) Prior Publication Data
US 2022/0187672 A1 Jun. 16, 2022

(30) Foreign Application Priority Data
Dec. 10, 2020 (CN) .......................... 202011454140.8

(51) Int. Cl.
G02F 1/167 (2019.01)
G02F 1/1362 (2006.01)
(Continued)

(52) U.S. Cl.
CPC ........ *G02F 1/167* (2013.01); *G02F 1/136286* (2013.01); *G02F 1/1368* (2013.01);
(Continued)

(58) Field of Classification Search
CPC .... G02F 1/167; G02F 1/16766; G02F 1/1677; G02F 1/13306; G02F 1/13312;
(Continued)

(56) References Cited

U.S. PATENT DOCUMENTS

2009/0174928 A1    7/2009  Kim et al.
2011/0286076 A1*  11/2011  Lin ..................... G02F 1/16761
                                                    359/296
2020/0126496 A1*   4/2020  Xu ........................ G09G 3/002

FOREIGN PATENT DOCUMENTS

CN    101963733 A    2/2011
CN    107910442 A    4/2018
(Continued)

OTHER PUBLICATIONS

China National Intellectual Property Administration, First office action of Chinese application No. 202011454140.8 issued on Oct. 10, 2022, which is foreign counterpart application of this US application.

*Primary Examiner* — Brandi N Thomas
(74) *Attorney, Agent, or Firm* — Lippes Mathias LLP (57) ABSTRACT

Electronic paper includes a display panel and a drive component. The display panel may include a plurality of pixels disposed in a display region and a photoelectric conversion transistor disposed in a non-display region. The drive component is electrically connected to the plurality of pixels, and is electrically connected to a current output terminal of the photoelectric conversion transistor.

20 Claims, 5 Drawing Sheets

(51) Int. Cl.
  *G02F 1/1368*   (2006.01)
  *G02F 1/16755*  (2019.01)
  *G02F 1/16766*  (2019.01)
  *G02F 1/1677*   (2019.01)
  *G02F 1/1685*   (2019.01)
  *G02F 1/16757*  (2019.01)

(52) U.S. Cl.
  CPC ...... *G02F 1/16755* (2019.01); *G02F 1/16766* (2019.01); *G02F 1/1677* (2019.01); *G02F 1/1685* (2019.01); *G02F 1/16757* (2019.01)

(58) Field of Classification Search
  CPC ............. G02F 1/136286; G02F 1/1368; G02F 1/16755; G02F 1/1685; G02F 1/13324; G02F 1/16757; G03F 7/0045; G03F 7/004; G03F 7/20; G03F 7/075; G03F 7/0757; G03F 7/0754; H01L 21/76254; H01L 27/1225; H01L 27/1251; H01L 27/127; H01L 29/66772; H01L 21/822; H01L 21/308; H01L 21/76251; H01L 21/76275; H01L 27/12; H01L 27/1214; H01L 27/1218; H01L 27/1266; H01L 29/78603; H01L 21/34; H01L 29/786
  See application file for complete search history.

(56)            References Cited

FOREIGN PATENT DOCUMENTS

| CN | 208795984 U | 4/2019 |
| CN | 111211186 A | 5/2020 |

* cited by examiner

ELECTRONIC PAPER AND DISPLAY DEVICE

CROSS REFERENCE TO RELATED APPLICATION

This application claims priority to Chinese Patent Application No. 202011454140.8, filed on Dec. 10, 2020 and entitled "ELECTRONIC PAPER", the entire content of which is incorporated herein by reference.

TECHNICAL FIELD

The present disclosure relates to the field of display technologies, and in particular to electronic paper and a display device.

BACKGROUND

Electronic paper is a new type of display device, and is mainly used in electronic tags, billboards, e-readers and the like. The display effect of the electronic paper is close to that of natural paper, and can reduce visual fatigue during reading.

SUMMARY

Embodiments of the present disclosure provide electronic paper and a display device.

In an aspect, electronic paper is provided. The electronic paper includes: a display panel and a drive component, wherein the display panel has a display region and a non-display region surrounding the display region, and the display panel includes a plurality of pixels disposed in the display region and a photoelectric conversion transistor disposed in the non-display region, the photoelectric conversion transistor including a current output terminal; and the drive component is electrically connected to the plurality of pixels, and is electrically connected to the current output terminal of the photoelectric conversion transistor.

Optionally, the photoelectric conversion transistor includes: an active layer, a first electrode and a second electrode that are overlapped with the active layer, and a gate insulated from the active layer; wherein one of the first electrode and the second electrode is electrically connected to the current output terminal, and the active layer includes a first portion that is in contact with the first electrode, a second portion that is in contact with the second electrode, and a channel portion disposed between the first portion and the second portion, wherein the channel portion includes at least one strip-shaped sub-channel, and a total length of the at least one strip-shaped sub-channel is greater than a distance between the first electrode and the second electrode.

Optionally, the at least one strip-shaped sub-channel is extended along a non-linear direction.

Optionally, the at least one strip-shaped sub-channel is extended along an extension direction of a fold line.

Optionally, the first electrode includes: a strip-shaped first sub-electrode and a plurality of strip-shaped second sub-electrodes, wherein one end of each of the plurality of second sub-electrodes is connected to the first sub-electrode; and the second electrode includes: a strip-shaped third sub-electrode and a plurality of strip-shaped fourth sub-electrodes, wherein one end of each of the plurality of fourth sub-electrodes is connected to the third sub-electrode; wherein the first sub-electrode, the second sub-electrodes, the third sub-electrode, and the fourth sub-electrodes are all overlapped with the active layer, the plurality of second sub-electrodes and the plurality of fourth sub-electrodes are all disposed between the first sub-electrode and the third sub-electrode, and the plurality of second sub-electrodes and the plurality of fourth sub-electrode are alternately distributed.

Optionally, a length direction of the first sub-electrode is parallel to a length direction of the third sub-electrode, length directions of the plurality of second sub-electrodes are parallel to length directions of the plurality of fourth sub-electrodes, and the length direction of the first sub-electrode is perpendicular to the length direction of the second sub-electrode.

Optionally, the channel portion includes a plurality of strip-shaped sub-channels extending in parallel.

Optionally, the first electrode includes: a strip-shaped first sub-electrode and a plurality of strip-shaped second sub-electrodes, wherein one end of each of the plurality of second sub-electrodes is connected to the first sub-electrode; and the second electrode includes: a strip-shaped third sub-electrode and a plurality of strip-shaped fourth sub-electrodes, wherein one end of each of the plurality of fourth sub-electrodes is connected to the third sub-electrode; wherein the second sub-electrodes and the fourth sub-electrodes are all overlapped with the active layer, and the first sub-electrode and the third sub-electrode are not overlapped with the active layer, the plurality of second sub-electrodes and the plurality of fourth sub-electrodes are all disposed between the first sub-electrode and the third sub-electrode, and the plurality of second sub-electrodes and the plurality of fourth sub-electrode are alternately distributed.

Optionally, the active layer in the photoelectric conversion transistor includes: a plurality of sub-active layers arranged at intervals, and the gate of the photoelectric conversion transistor includes: a plurality of sub-gates that are in one-to-one correspondence with the plurality of sub-active layers, wherein the plurality of sub-gates are electrically connected in sequence.

Optionally, the pixel includes a thin-film transistor, and a pixel electrode electrically connected to the thin-film transistor, wherein the thin-film transistor and the photoelectric conversion transistor are disposed in the same layer.

Optionally, the other of the first electrode and the second electrode is in one of a suspended state and a grounded state.

Optionally, the photoelectric conversion transistor is disposed on at least one side of the display region.

Optionally, the non-display region includes: a bonding region disposed on one side of the display region, and at least two transistor regions disposed on other sides of the display region, and the photoelectric conversion transistor is disposed in at least one of the transistor regions.

Optionally, one photoelectric conversion transistor is disposed in each of the transistor regions, and the photoelectric conversion transistors in the transistor regions are connected in series.

Optionally, the electronic paper further includes: a flexible printed circuit, wherein at least part of the flexible printed circuit is disposed in the bonding region, and the flexible printed circuit is configured to be connected to the pixels and the drive component.

Optionally, the display panel includes: two substrates facing each other, and an electrophoretic layer disposed between the two substrates, and the plurality of pixels and the photoelectric conversion transistor are disposed in one of the two substrates.

Optionally, the one of the two substrates includes: a first base, and the photoelectric conversion transistor, a thin-film transistor, and a pixel electrode electrically connected to the thin-film transistor on the first base; and the other of the two substrates includes: a second base, and a common electrode on the second base.

Optionally, the electrophoretic layer includes: a plurality of electrophoretic capsules, wherein the electrophoretic capsule includes: a capsule body, and electrophoretic fluid and charged particles in the capsule body.

In another aspect, a display device is provided. The display device includes: electronic paper, and a housing connected to the electronic paper, wherein the electronic paper includes: a display panel and a drive component, wherein the display panel has a display region and a non-display region surrounding the display region, and the display panel includes a plurality of pixels disposed in the display region and a photoelectric conversion transistor disposed in the non-display region, the photoelectric conversion transistor including a current output terminal; and the drive component is electrically connected to the plurality of pixels, and is electrically connected to the current output terminal of the photoelectric conversion transistor.

Optionally, the display device further includes a battery, wherein the battery is electrically connected to the current output terminal of the photoelectric conversion transistor and the drive component.

DETAILED DESCRIPTION

For clearer descriptions of the objectives, technical solutions, and advantages of the present disclosure, embodiments of the present disclosure are described in detail hereinafter with reference to the accompanying drawings.

The electronic paper in a conventional display device usually includes a display panel and a drive component electrically connected to the display panel. The display panel can display images under the drive of the drive component. The display panel is usually a display panel prepared with the electrophoretic paper display (EPD) technology. When the display panel displays a static image, the drive circuit of the electronic paper does not need to consume power. When the image displayed on the display panel is refreshed, the drive circuit of the electronic paper needs to consume a large amount of power.

For this, in the display device, a rechargeable battery is usually used as the power source of the electronic paper during display. However, if the display device is used when the charging condition is not available (e.g., outdoor), the display panel in the display device cannot display images after the power of the rechargeable battery in the display device is exhausted.

In order to ensure that the display device can be used normally when the charging condition is not available, a solar panel may be used as the power source of the electronic paper during display. For example, please refer to FIG. 1, which shows a schematic structural diagram of a common display device at present. A display panel 01 and a solar panel 02 in the electronic paper are usually disposed on the same side of the display device. The solar panel 02 can convert solar energy into electric energy, such that the drive component in the electronic paper can drive the display panel 01 to display images.

Figure 1:
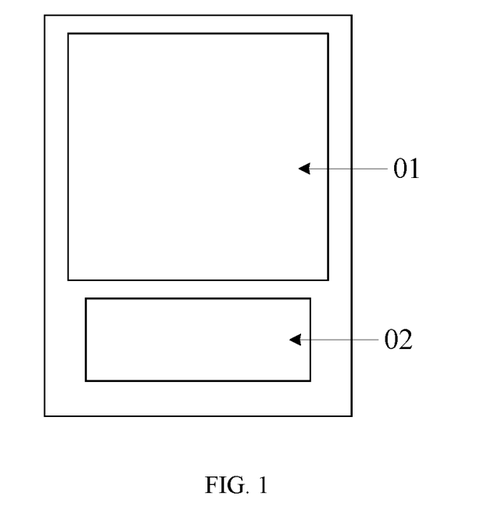
FIG. 1 is a schematic structural diagram of a common display device at present.

However, as shown in FIG. 1, since the display panel 01 and the solar panel 02 are both disposed on the same side of the display device, and the solar panel 02 usually occupies a relatively large space in the display device, the screen-to-body ratio of the display device provided with the solar panel 02 is relatively low.

Figure 2:
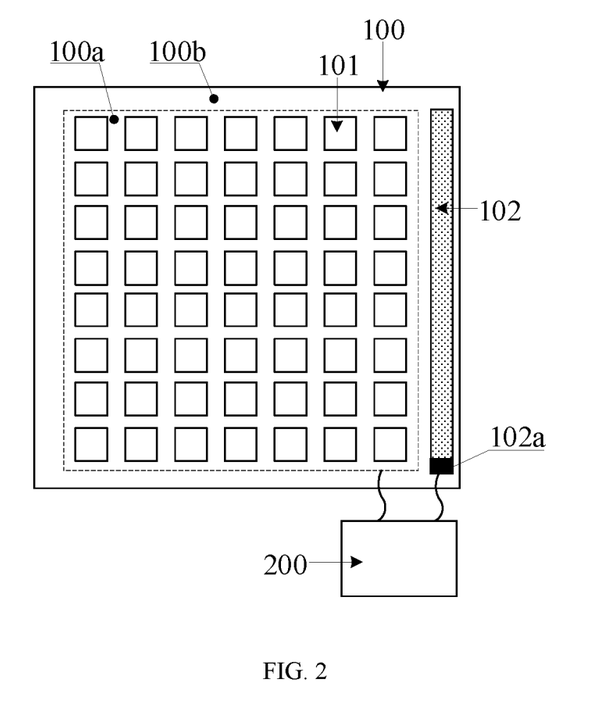
FIG. 2 is a schematic structural diagram of electronic paper according to an embodiment of the present disclosure.

FIG. 2 shows a schematic structural diagram of electronic paper according to an embodiment of the present disclosure. The electronic paper may include a display panel 100 and a drive component 200.

The display panel 100 has a display region 100*a* and a non-display region 100*b* surrounding the display region 100*a*. The display panel 100 may include a plurality of pixels 101 disposed in the display region 100*a*, and a photoelectric conversion transistor 102 disposed in the non-display region 100*b*. The photoelectric conversion transistor 102 includes a current output terminal 102*a*. In the present disclosure, the plurality of pixels 101 disposed in the display region 100*a* may be arranged in an array into a plurality of rows and a plurality of columns.

The drive component 200 may be electrically connected to the plurality of pixels 101 in the display panel 100, and may also be electrically connected to the current output terminal 102*a* of the photoelectric conversion transistor 102.

In the embodiment of the present disclosure, the photoelectric conversion transistor 102 is a thin-film transistor, which may include an active layer. Under ambient light irradiation, the number of hole-electron pairs in the active layer of the photoelectric conversion transistor 102 increases, such that the leakage current in the photoelectric conversion transistor 102 increases. The leakage current can be transmitted to the drive component 200 via the current output terminal 102*a* of the photoelectric conversion transistor 102. In this way, the drive component 200 can drive the plurality of pixels 101 in the display panel 100 to operate by means of the electric energy provided by the current output terminal 102*a* of the photoelectric conversion transistor 102, such that the electronic paper can display corresponding images. That is, the light energy of the ambient light can be converted into electric energy by the photoelectric conversion transistor 102, and the converted electric energy can be used as a power source of the electronic paper during display, such that the electronic paper can be used normally when the charging condition is not available, which improves the flexibility in use of the electronic paper. In addition, since the photoelectric conversion transistor 102 is disposed in the non-display region 100*b* of the display panel 100, when the electronic paper is integrated in a display device, the photoelectric conversion transistor 102 does not occupy other space than the display panel 100 of the display device, which effectively increases the screen-to-body ratio of the display device. Thus, the display device has a better display effect.

In summary, the electronic paper according to the embodiment of the present disclosure includes a display panel and a drive component. The display panel may include a photoelectric conversion transistor disposed in the non-display region. The drive component may be electrically connected to the current output terminal in the photoelectric conversion transistor. The photoelectric conversion transistor can convert light energy into electric energy, and the converted electric energy can be used as the power source of the electronic paper during display, such that the electronic paper can be used normally when the charging condition is not available, which improves the flexibility in use of the electronic paper. Moreover, when the electronic paper is integrated in a display device, the photoelectric conversion transistor does not occupy other space than the display panel 100 of the display device, which effectively increases the screen-to-body ratio of the display device. Thus, the display device has a better display effect.

Figure 3:
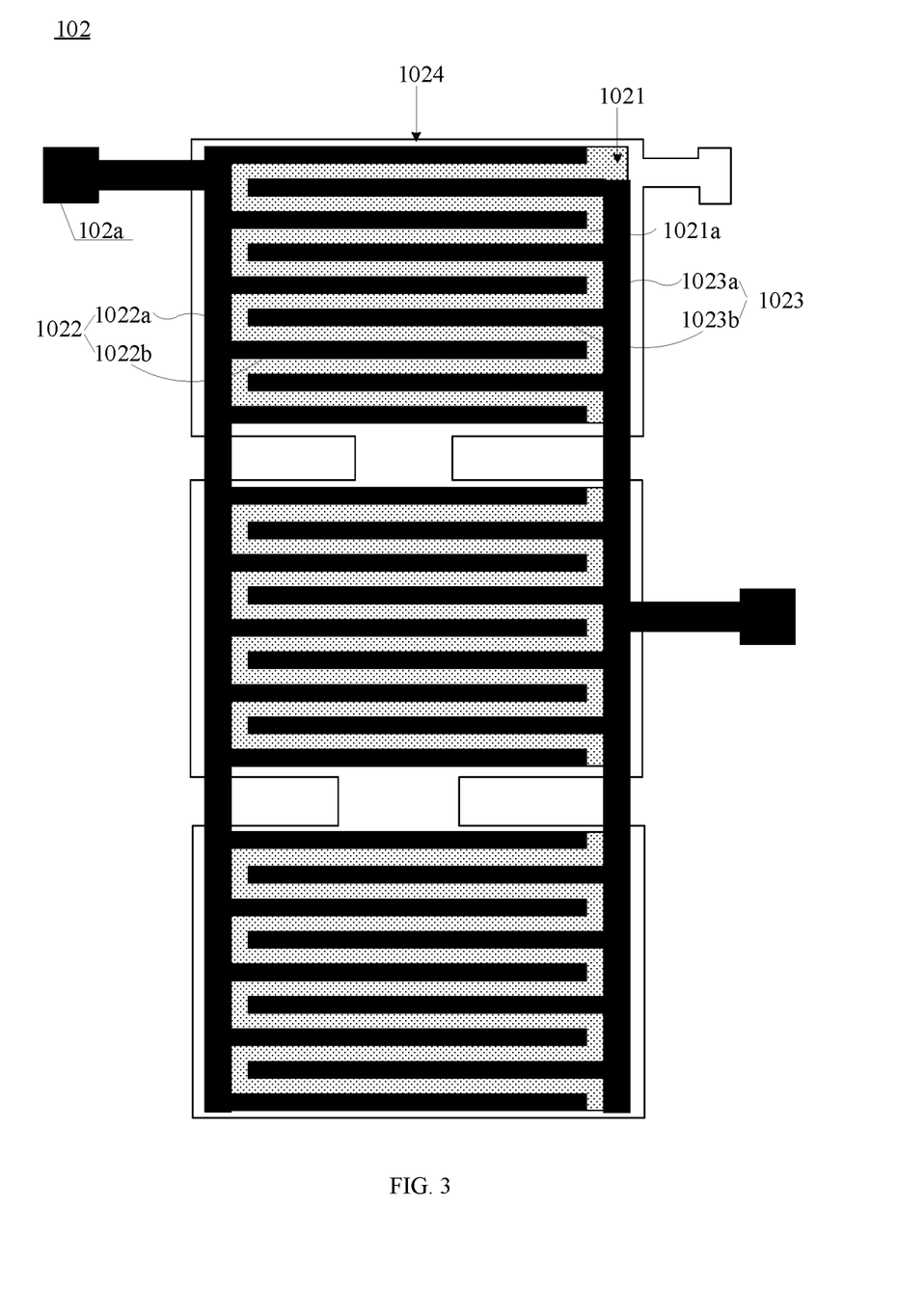
FIG. 3 is a schematic structural diagram of a photoelectric conversion transistor in electronic paper according to an embodiment of the present disclosure.

Optionally, FIG. 3 shows a schematic structural diagram of a photoelectric conversion transistor in electronic paper according to an embodiment of the present disclosure. The photoelectric conversion transistor 102 in the display panel 100 in the electronic paper may include an active layer 1021, a first electrode 1022 and a second electrode 1023 that are overlapped with the active layer 1021, and a gate 1024 insulated from the active layer 1021. One of the first electrode 1022 and the second electrode 1023 of the photoelectric conversion transistor 102 may be electrically connected to the current output terminal 102*a* of the photoelectric conversion transistor 102.

It should be noted that the other of the first electrode 1022 and the second electrode 1023 in the photoelectric conversion transistor 102 may be in one of a suspended state and a grounded state. When the other of the first electrode 1022 and the second electrode 1023 is in a suspended state, the electrode is not electrically connected to a power terminal. When the other of the first electrode 1022 and the second electrode 1023 is in a grounded state, the electrode may be electrically connected to a ground power terminal in the electronic paper. The embodiments of the present disclosure are illustrated by taking an example in which the first electrode 1022 of the photoelectric conversion transistor 102 is electrically connected to the current output terminal 102*a* of the photoelectric conversion transistor 102 and the second electrode 1023 is electrically connected to the ground power terminal in the electronic paper.

It should also be noted that the first electrode 1022 of the photoelectric conversion transistor 102 may be one of a source and a drain, and the second electrode 1023 of the photoelectric conversion transistor 102 may be the other of the source and the drain.

In the embodiment of the present disclosure, the active layer 1021 in the photoelectric conversion transistor 102 includes a first portion that is in contact with the first electrode 1022, a second portion that is in contact with the second electrode 1023, and a channel portion disposed between the first portion and the second portion. The region where the channel portion in the active layer 1021 is disposed is usually referred to as a channel region. Under ambient light irradiation, the number of hole-electron pairs in the channel portion of the active layer 1021 increases, such that the leakage current generated in the channel portion increases. The leakage current generated in the channel portion may be transmitted to the drive component 200 in the electronic paper through the current output terminal 102*a* in the photoelectric conversion transistor 102, such that the drive component 200 can drive the pixels 101 disposed in the display region 100*a* of the display panel 100 to operate.

Optionally, the material of the active layer 1021 in the photoelectric conversion transistor 102 may be an oxide semiconductor material, such as zinc oxide (ZnO) or aluminum oxide ($Al_2O_3$). Since the oxide semiconductor material is sensitive to light, it is easy to generate a leakage current under light irradiation. Therefore, when the material of the active layer 1021 in the photoelectric conversion transistor 102 is an oxide semiconductor material, the efficiency of photoelectric conversion of the photoelectric conversion transistor 102 can be improved.

In the present disclosure, the channel portion in the active layer 1021 may include at least one strip-shaped sub-channel 1021*a*. The total length of the at least one strip-shaped sub-channel 1021*a* is greater than the distance between the first electrode 1022 and the second electrode 1023. In this case, the channel portion formed by the at least one strip-shaped sub-channel 1021*a* is relatively long. Moreover, since the magnitude of the leakage current generated by the channel portion in the active layer 1021 under ambient light irradiation is positively correlated with the length of the channel portion, the leakage current generated by the channel portion is relatively large under ambient light irradiation, which can improve the ability to drive the pixels 101 in the display region 100*a* of the display panel 100.

In the embodiments of the present disclosure, the channel portion in the active layer 1021 may be in various structures. The embodiments of the present disclosure take the following two optional implementations as examples for illustration.

In a first optional implementation, as shown in FIG. 3, the at least one sub-channel 1021*a* of the channel portion in the active layer 1021 is extended along a non-linear direction. For example, the channel portion includes only one sub-channel 1021*a*, and the sub-channel 1021*a* may be extended along a non-linear direction.

In an exemplary embodiment, the first electrode 1022 of the photoelectric conversion transistor 102 may include a strip-shaped first sub-electrode 1022*a* and a plurality of strip-shaped second sub-electrodes 1022*b*. One end of each of the plurality of second sub-electrodes 1022*b* may be electrically connected to the first sub-electrode 1022*a*.

The second electrode 1023 of the photoelectric conversion transistor 102 may include a strip-shaped third sub-electrode 1023*a* and a plurality of strip-shaped fourth sub-electrodes 1023*b*. One end of each of the plurality of fourth sub-electrodes 1023*b* may be electrically connected to the third sub-electrode 1023*a*.

Here, the first sub-electrode 1022*a*, the plurality of second sub-electrodes 1022*b*, the third sub-electrode 1023*a*, and the plurality of fourth sub-electrodes 1023*b* may all be overlapped with the active layer 1021. The plurality of second sub-electrodes 1022*b* and the plurality of fourth sub-electrodes 1023*b* are all disposed between the first sub-electrode 1022*a* and the third sub-electrode 1023*a*. The plurality of second sub-electrodes 1022*b* and the plurality of fourth sub-electrodes 1023*b* are alternately distributed.

In this case, the at least one sub-channel 1021*a* in the active layer 1021 may be extended along an extension direction of a fold line. The channel portion in the active layer 1021 is relatively long, and the leakage current generated under ambient light irradiation is relatively large.

Figure 4:
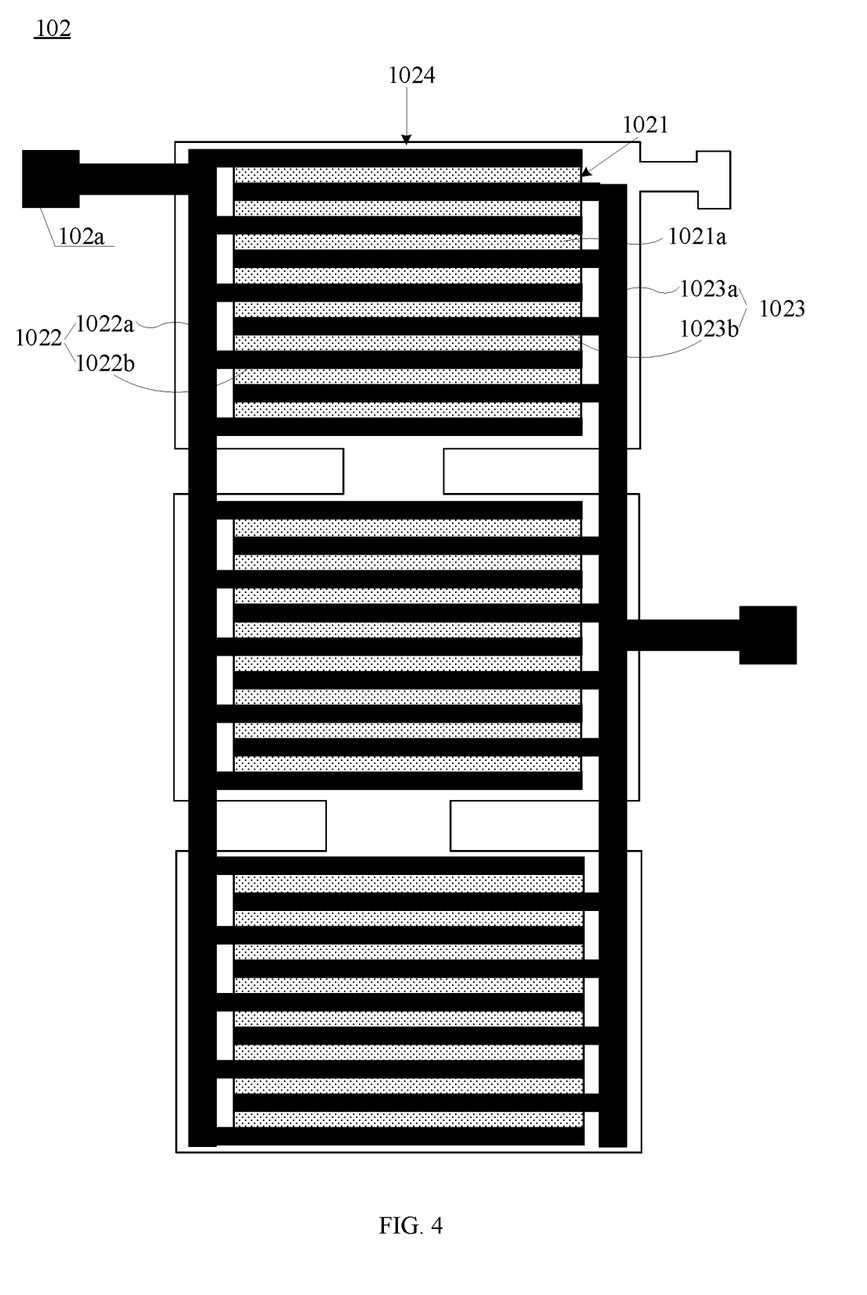
FIG. 4 is a schematic structural diagram of a photoelectric conversion transistor in another electronic paper according to an embodiment of the present disclosure.

In a second optional implementation, as shown in FIG. 4, which shows a schematic structural diagram of a photoelectric conversion transistor in another electronic paper according to an embodiment of the present disclosure, the channel portion in the active layer 1021 includes a plurality of strip-shaped sub-channels 1021a extending in parallel.

In an exemplary embodiment, the first electrode 1022 of the photoelectric conversion transistor 102 may include a strip-shaped first sub-electrode 1022a and a plurality of strip-shaped second sub-electrodes 1022b. One end of each of the plurality of second sub-electrodes 1022b may be electrically connected to the first sub-electrode 1022a.

The second electrode 1023 of the photoelectric conversion transistor 102 may include a strip-shaped third sub-electrode 1023a and a plurality of strip-shaped fourth sub-electrodes 1023b. One end of each of the plurality of fourth sub-electrodes 1023b may be electrically connected to the third sub-electrode 1023a.

The plurality of second sub-electrodes 1022b and the plurality of fourth sub-electrodes 1023b may all be overlapped with the active layer 1021, and the first sub-electrode 1022a and the third sub-electrode 1023a are not overlapped with the active layer 1021. The plurality of second sub-electrodes 1022b and the plurality of fourth sub-electrodes 1023b are all disposed between the first sub-electrode 1022a and the third sub-electrode 1023a. The plurality of second sub-electrodes 1022b and the plurality of fourth sub-electrodes 1023b are alternately distributed.

In this case, each second sub-electrode 1022b, its adjacent fourth sub-electrode 1023b, the active layer 1021 and the gate 1024 may constitute one sub-photoelectric conversion transistor. Moreover, since one end of each second sub-electrode 1022b is electrically connected to the first sub-electrode 1022a, and one end of each fourth sub-electrode 1023b is electrically connected to the third sub-electrode 1023a, the photoelectric conversion transistor 102 serve as a plurality of sub-photoelectric conversion transistors connected in series. In the present disclosure, the length-width ratio of the strip-shaped sub-channel 1021a in each sub-photoelectric conversion transistor is relatively large, and thus the leakage current generated under ambient light irradiation by the photoelectric conversion transistor 102 consisting of a plurality of sub-photoelectric conversion transistors connected in series is relatively large.

In the embodiment of the present disclosure, as shown in FIGS. 3 and 4, in the photoelectric conversion transistor 102, the length direction of first sub-electrode 1022a is parallel to the length direction of the third sub-electrode 1023a, and the length directions of the plurality of second sub-electrodes 1022b are parallel to the length directions of the plurality of fourth sub-electrodes 1023b. The length direction of the first sub-electrode 1022a may be perpendicular to the length direction of each second sub-electrode 1022b, and the length direction of the third sub-electrode 1023b may be perpendicular to the length direction of each fourth sub-electrode 1023b.

In the present disclosure, as shown in FIGS. 3 and 4, the active layer 1021 in the photoelectric conversion transistor 102 may include a plurality of sub-active layers arranged at intervals. The gate 1024 of the photoelectric conversion transistor 102 may include a plurality of sub-gates that are in one-to-one correspondence with the plurality of sub-active layers. The plurality of sub-gates are electrically connected in sequence, that is, the plurality of sub-gates are connected in series. By dividing the active layer 1021 in the photoelectric conversion transistor 102 into a plurality of sub-active layers, and dividing the gate 1024 of the photoelectric conversion transistor 102 into a plurality of sub-gates, the magnitude of static electricity generated in the active layer 1021 and the gate 1024 can be effectively reduced when the areas of the active layer 1021 and the gate 1024 in the photoelectric conversion transistor 102 are relatively large, which further improves the electrical property of the photoelectric conversion transistor 102.

Figure 5:
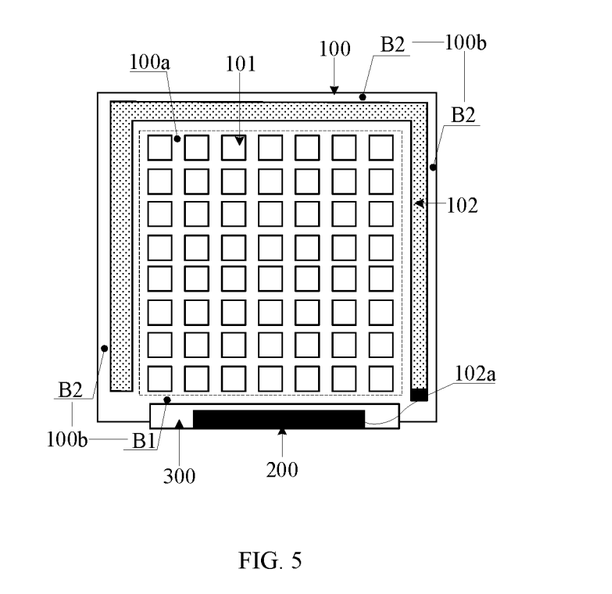
FIG. 5 is a schematic structural diagram of another electronic paper according to an embodiment of the present disclosure.

In the embodiment of the present disclosure, the photoelectric conversion transistor 102 in the electronic paper may be disposed on at least one side of the display region 100a in the display panel 100. In an exemplary embodiment, FIG. 5 shows a schematic structural diagram of another electronic paper according to an embodiment of the present disclosure. The non-display region 100b of the display panel 100 includes a bonding region B1 on one side of the display region 100a, and at least two transistor regions B2 on other sides of the display region 100a. For example, assuming that the display region 100a of the display panel 100 is rectangular, then there are three transistor regions B2 in the non-display region 100b. The photoelectric conversion transistor 102 in the electronic paper may be disposed in at least one of the transistor regions B2. In this case, by disposing the photoelectric conversion transistor 102 in regions other than the bonding region 100b, the interference in the bonding region 100b during photoelectric conversion by the photoelectric conversion transistor 102 can be avoided.

Optionally, one photoelectric conversion transistor 102 is disposed in each transistor region B2 in the non-display region 100b, and the photoelectric conversion transistors 102 in the transistor regions B2 are connected in series. In this way, the photoelectric conversion transistors 102 are on a plurality of sides of the display region 100a, which can improve the efficiency of photoelectric conversion by the photoelectric conversion transistor.

It should be noted that in other possible implementations, the photoelectric conversion transistors 102 in the transistor regions B2 may not be connected in series, but the photoelectric conversion transistors 102 in the transistor regions B2 are in the same structure, which may be made reference to the photoelectric conversion transistor 102 shown in FIG. 3 or FIG. 4.

In the embodiments of the present disclosure, the electronic paper may further include a flexible printed circuit (FPC) 300. The bonding region B1 of the display panel 100 is configured to connect with the flexible printed circuit 300. At least part of the flexible printed circuit 300 is disposed in the bonding region B1, and the flexible printed circuit 300 is configured to be connected to the plurality of pixels 101 and the drive component 200 in the display panel 100. In this way, the drive component 200 may be electrically connected to the plurality of pixels 101 in the display panel 100 by the flexible printed circuit 300. In other possible implementations, the drive component 200 may also be integrated in the flexible printed circuit 300.

Figure 6:
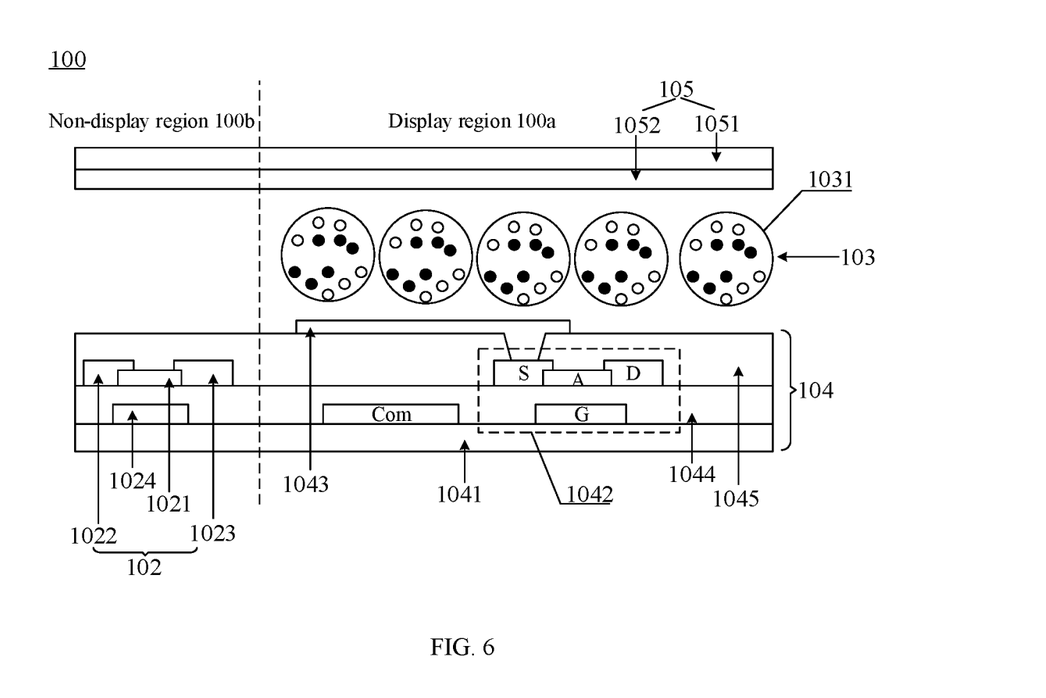
FIG. 6 is a schematic diagram of a film layer structure of a display panel according to an embodiment of the present disclosure.

Optionally, FIG. 6 shows a schematic diagram of a film layer structure of a display panel according to an embodiment of the present disclosure. The display panel 100 may include two substrates facing each other, and an electrophoretic layer 103 disposed between the two substrates. The plurality of pixels 101 and the photoelectric conversion transistor 102 in the display panel 100 are disposed in one of the two substrates.

In an exemplary embodiment, the two substrates in the display panel 100 are a first substrate 104 and a second substrate 105, respectively. The following embodiments are illustrated by taking an example in which the plurality of pixels 101 and the photoelectric conversion transistor 102 in the display panel 100 are all disposed in the first substrate 104.

The first substrate 104 may include a first base 1041, and the photoelectric conversion transistor 102, a thin-film transistor 1042 and a pixel electrode 1043 electrically connected to the thin-film transistor 1042 on the first base 1041. In the present disclosure, the display region 100a in the display panel 100 consists of a plurality of pixel regions. The thin-film transistor 1042 and the pixel electrode 1043 in each pixel region may constitute a pixel 101.

In the embodiment of the present disclosure, the thin-film transistor 1042 in each pixel 101 may be disposed in the same layer as the photoelectric conversion transistor 102 in the display panel 100.

In an exemplary embodiment, the thin-film transistor 1042 in each pixel 101 may include a source S, a drain D, a gate G, and an active layer A. The active layer A in the thin-film transistor 1042 may be disposed in the same layer as the active layer 1021 in the photoelectric conversion transistor 102, and the active layer A is made from the same material as the active layer 1021. That is, the active layer A in the thin-film transistor 1042 and the active layer 1021 in the photoelectric conversion transistor 102 are formed by a one patterning process. The source S and the drain D of the thin-film transistor 1042 may be disposed in the same layer as the first electrode 1022 and the second electrode 1023 of the photoelectric conversion transistor 102, and the source S and the drain D are made from the same material as first electrode 1022 and the second electrode 1023. That is, the source S and the drain D of the thin-film transistor 1042 and the first electrode 1022 and the second electrode 1023 of the photoelectric conversion transistor 102 are formed by a one patterning process. The gate G of the thin-film transistor 1042 and the gate 1024 of the photoelectric conversion transistor 102 may be disposed in the same layer and made from the same material. That is, the gate G of the thin-film transistor 1042 and the gate 1024 of the photoelectric conversion transistor 102 are formed by a one patterning process.

In the present disclosure, when the thin-film transistor 1042 in each pixel 101 is disposed in the same layer as the photoelectric conversion transistor 102 in the display panel 100, the manufacturing process of the display panel 100 is relatively simple and the manufacturing cost is low.

Optionally, as shown in FIG. 6, the first substrate 104 may include a first base 1041, and a first conductive pattern, a gate insulating layer 1044, an active layer pattern, a second conductive pattern, a planarization layer 1045, and a third electrode pattern laminated in a direction perpendicular to and distal from the first base 1041.

Here, the first conductive pattern may include the gate G of the thin-film transistor 1042, the gate 1024 of the photoelectric conversion transistor 102, and an auxiliary electrode Com. The auxiliary electrode Com and the pixel electrode 1043 may form storage capacitance when the display panel 100 displays, so as to maintain the stability of the voltage applied to the pixel electrode 1043.

The active layer pattern may include the active layer A in the thin-film transistor 1042 and the active layer 1021 in the photoelectric conversion transistor 102.

The second conductive pattern may include the source S and the drain D of the thin-film transistor 1042, and the first electrode 1022 and the second electrode 1023 of the photoelectric conversion transistor 102.

The third conductive pattern may include the pixel electrode 1043 in each pixel region.

Optionally, the second substrate 105 may include a second base 1051, and a common electrode 1052 disposed on the second base 1051.

Optionally, the electrophoretic layer 103 disposed between the first substrate 104 and the second substrate 105 includes a plurality of electrophoretic capsules 1031. Each electrophoretic capsule 1031 may include a capsule body, and electrophoretic fluid and charged particles disposed in the capsule body. The charged particles may include black particles, white particles, colored particles and the like.

In the present disclosure, when voltage is applied to the pixel electrode 1043 in each pixel 101 by the drive component 200, a voltage difference is generated between each of the pixel electrodes 1043 and the common electrode 1052. Under the action of the voltage difference, the charged particles in each electrophoretic capsule 1031 move in the electrophoretic fluid, to implement the display of the display panel 100.

Optionally, the display panel 100 further includes a plurality of gate lines and a plurality of data lines. Each gate line may be electrically connected to the gate G of each thin-film transistor 1042 in one row of pixels 101. Each data line may be electrically connected to one of the source S and the drain D of each thin-film transistor 1042 in one column of pixels 101, and the other of the source S and the drain D may be electrically connected to the pixel electrode 1043. The plurality of gate lines may be arranged in parallel. The plurality of data lines may also be arranged in parallel. The extension direction of the gate line may be perpendicular to the extension direction of the data line.

Figure 7:
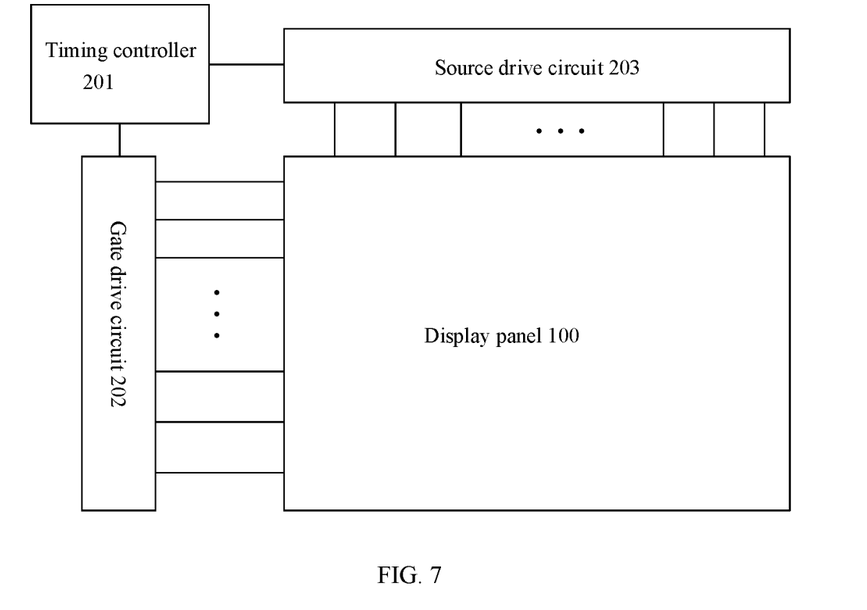
FIG. 7 is a schematic structural diagram of yet another electronic paper according to an embodiment of the present disclosure.

FIG. 7 shows a schematic structural diagram of still another electronic paper according to an embodiment of the present disclosure. The drive component 200 in the electronic paper may include a timing controller 201, a gate drive circuit 202, and a source drive circuit 203. The gate drive circuit 202 may be electrically connected to the plurality of gate lines, and the gate drive circuit 202 is configured to progressively scan the rows of pixels 101 in the display panel 100. The source drive circuit 203 may be electrically connected to the plurality of data lines, and is configured to provide data signals for the columns of pixels 101 in the display panel 100. The timing controller 201 is connected to the gate drive circuit 202 and the source drive circuit 203, and configured to control the signals output from the gate drive circuit 202 and the source drive circuit 203.

In the embodiment of the present disclosure, the current output terminal 102a of the photoelectric conversion transistor 102 may be electrically connected to the timing controller 201, the gate drive circuit 202, and the source drive circuit 203 in the drive component 200. The photoelectric conversion transistor 102 can convert light energy of the ambient light into electric energy, and then provide the electric energy for the timing controller 201, the gate drive circuit 202 and the source drive circuit 203 in the drive component 200. The gate 1024 of the photoelectric conversion transistor 102 may be electrically connected to the gate drive circuit 202 in the drive component 200. In this way, gate voltage may be provided for the gate 1024 of the photoelectric conversion transistor 102 through the gate drive circuit 202, and the first electrode 1022 and the second electrode 1023 of the photoelectric conversion transistor 102 can be controlled to be conducted through the gate voltage, such that the leakage current generated by the photoelectric conversion transistor 102 under light irradiation is output more easily through the current output terminal 102a.

In summary, the electronic paper according to the embodiment of the present disclosure includes a display panel and a drive component. The display panel may include a photoelectric conversion transistor disposed in the non-display region. The drive component may be electrically connected to the current output terminal of the photoelectric conversion transistor. The photoelectric conversion transistor can convert light energy into electric energy, and the converted electric energy can be used as the power source of electronic paper during display, such that the electronic paper can be used normally when the charging condition is not available, which improves the flexibility in use of the electronic paper. Moreover, when the electronic paper is integrated in a display device, the photoelectric conversion transistor does not occupy other space, other than the display panel, of the display device, which effectively increases the screen-to-body ratio of the display device. Thus, the device display has a better display effect.

Figure 8:
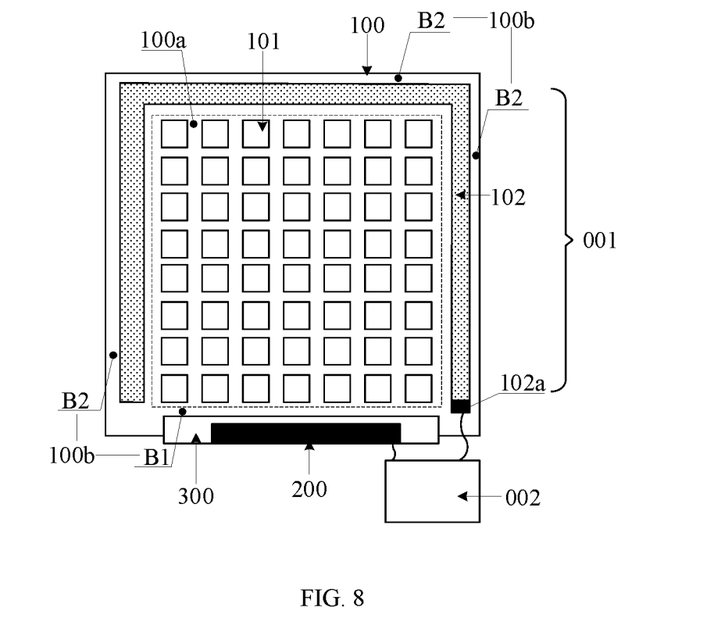
FIG. 8 is a schematic structural diagram of a display device according to an embodiment of the present disclosure.

An embodiment of the present disclosure further provides a display device, which may be an electronic tag, a billboard, an electronic reader, and the like. FIG. 8 shows a schematic structural diagram of a display device according to an embodiment of the present disclosure. The display device may include electronic paper 001, and a housing (not shown) connected to the electronic paper 001. The electronic paper 001 may be the electronic paper described in the above embodiments. For example, the electronic paper may be the electronic paper shown in FIG. 2, FIG. 5, or FIG. 7.

Optionally, the display device may further include a battery 002. The battery 002 may be electrically connected to the current output terminal 102a of the photoelectric conversion transistor 102 and the drive component 200 in the electronic paper 001. The battery 002 may be disposed in a cavity formed by the electronic paper 001 and the housing.

Under ambient light irradiation, the photoelectric conversion transistor 102 can convert light energy of the ambient light into electric energy, and the converted electric energy may be transmitted to the battery 002 through the current output terminal 102a of the photoelectric conversion transistor 102 for storage. After the battery 002 stores the electric energy transmitted by the current output terminal 102a of the photoelectric conversion transistor 102, the battery 002 may provide electric energy for the drive component 200, such that the drive component 200 can drive the plurality of pixels 101 in the display panel 100 to operate, and then the display panel 100 can display corresponding images. In the present disclosure, when the display device includes the battery 002 electrically connected to the current output terminal 102a of the photoelectric conversion transistor 102, the display device can not only convert the light energy of the ambient light into electric energy for storage in the battery 002, but also work normally by taking advantage of the electric energy stored in the battery 002 in scenarios with weak ambient light.

It should be noted that in the drawings, the sizes of layers and regions may be exaggerated for clarity of illustration. It can also be understood that when an element or layer is referred to as being "on" another element or layer, it may be directly on the other element or an intermediate layer may be present. In addition, it can be understood that when an element or layer is referred to as being "under" another element or layer, it may be directly under the other element, or more than one intermediate layer or element may be present. In addition, it can also be understood that when a layer or element is referred to as being "between" two layers or two elements, it may be the only layer or element between the two layers or two elements, or more than one intermediate layer or element may be present. Similar reference numerals indicate similar elements throughout.

In the present disclosure, the terms "first" and "second" are only used for descriptive purposes, and cannot be understood as indicating or implying relative importance. The term "a plurality of" refers to two or more, unless specifically defined otherwise.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. Electronic paper, comprising: a display panel and a drive component, wherein
    the display panel has a display region and a non-display region surrounding the display region, and the display panel comprises a plurality of pixels disposed in the display region and a photoelectric conversion transistor disposed in the non-display region, the photoelectric conversion transistor comprising a current output terminal;
    the drive component is electrically connected to the plurality of pixels, and is electrically connected to the current output terminal of the photoelectric conversion transistor; and
    the photoelectric conversion transistor comprises: an active layer, a first electrode and a second electrode that are overlapped with the active layer, and a gate insulated from the active layer,
    wherein one of the first electrode and the second electrode is electrically connected to the current output terminal, and the active layer comprises a first portion that is in contact with the first electrode, a second portion that is in contact with the second electrode, and a channel portion disposed between the first portion and the second portion, wherein the channel portion comprises at least one strip-shaped sub-channel, and a total length of the at least one strip-shaped sub-channel is greater than a distance between the first electrode and the second electrode.

2. The electronic paper according to claim 1, wherein the at least one strip-shaped sub-channel is extended along a non-linear direction.

3. The electronic paper according to claim 2, wherein the at least one strip-shaped sub-channel is extended along an extension direction of a fold line.

4. The electronic paper according to claim 3, wherein
    the first electrode comprises: a strip-shaped first sub-electrode and a plurality of strip-shaped second sub-electrodes, wherein one end of each of the plurality of second sub-electrodes is connected to the first sub-electrode; and
    the second electrode comprises: a strip-shaped third sub-electrode and a plurality of strip-shaped fourth sub-electrodes, wherein one end of each of the plurality of fourth sub-electrodes is connected to the third sub-electrode,
    wherein the first sub-electrode, the second sub-electrodes, the third sub-electrode, and the fourth sub-electrodes are all overlapped with the active layer, the plurality of second sub-electrodes and the plurality of fourth sub-electrodes are all disposed between the first sub-electrode and the third sub-electrode, and the plurality of second sub-electrodes and the plurality of fourth sub-electrode are alternately distributed.

5. The electronic paper according to claim 4, wherein a length direction of the first sub-electrode is parallel to a length direction of the third sub-electrode, length directions of the plurality of second sub-electrodes are parallel to length directions of the plurality of fourth sub-electrodes, and the length direction of the first sub-electrode is perpendicular to the length direction of the second sub-electrode.

6. The electronic paper according to claim 1, wherein the channel portion comprises a plurality of strip-shaped sub-channels extending in parallel.

7. The electronic paper according to claim 6, wherein
the first electrode comprises: a strip-shaped first sub-electrode and a plurality of strip-shaped second sub-electrodes, wherein one end of each of the plurality of second sub-electrodes is connected to the first sub-electrode; and
the second electrode comprises: a strip-shaped third sub-electrode and a plurality of strip-shaped fourth sub-electrodes, wherein one end of each of the plurality of fourth sub-electrodes is connected to the third sub-electrode,
wherein the second sub-electrodes and the fourth sub-electrodes are all overlapped with the active layer, the first sub-electrode and the third sub-electrode are not overlapped with the active layer, the plurality of second sub-electrodes and the plurality of fourth sub-electrodes are all disposed between the first sub-electrode and the third sub-electrode, and the plurality of second sub-electrodes and the plurality of fourth sub-electrode are alternately distributed.

8. The electronic paper according to claim 1, wherein the active layer in the photoelectric conversion transistor comprises: a plurality of sub- active layers disposed at intervals, and the gate in the photoelectric conversion transistor comprises: a plurality of sub-gates that are in one-to-one correspondence with the plurality of sub-active layers, wherein the plurality of sub-gates are electrically connected in sequence.

9. The electronic paper according to claim 1, wherein the pixel comprises a thin-film transistor, and a pixel electrode electrically connected to the thin-film transistor, wherein the thin-film transistor and the photoelectric conversion transistor are disposed in a same layer.

10. The electronic paper according to claim 1, wherein the other one of the first electrode and the second electrode is in one of a suspended state and a grounded state.

11. The electronic paper according to claim 1, wherein the photoelectric conversion transistor is disposed on at least one side of the display region.

12. The electronic paper according to claim 11, wherein the non-display region comprises: a bonding region on one side of the display region, and at least two transistor regions on other sides of the display region, and the photoelectric conversion transistor is disposed in at least one of the transistor regions.

13. The electronic paper according to claim 12, wherein one photoelectric conversion transistor is disposed in each of transistor regions, and the photoelectric conversion transistors in the transistor regions are connected in series.

14. The electronic paper according to claim 13, further comprising: a flexible printed circuit, wherein at least a portion of the flexible printed circuit is disposed in the bonding region, and the flexible printed circuit is configured to be connected to the pixels and the drive component.

15. The electronic paper according to claim 1, wherein the display panel comprises: two substrates facing each other, and an electrophoretic layer disposed between the two substrates, wherein the plurality of pixels and the photoelectric conversion transistor are disposed in one of the two substrates.

16. The electronic paper according to claim 15, wherein the one of the two substrates comprises: a first base, and the photoelectric conversion transistor, a thin-film transistor, and a pixel electrode electrically connected to the thin-film transistor, which are disposed on the first base; and
the other of the two substrates comprises: a second base, and a common electrode on the second base.

17. The electronic paper according to claim 16, wherein the electrophoretic layer comprises: a plurality of electrophoretic capsules, wherein the electrophoretic capsule comprises: a capsule body, and electrophoretic fluid and charged particles in the capsule body.

18. A display device, comprising: electronic paper, and a housing connected to the electronic paper, wherein
the electronic paper comprises: a display panel and a drive component, wherein
the display panel has a display region and a non-display region surrounding the display region, and the display panel comprises a plurality of pixels disposed in the display region and a photoelectric conversion transistor disposed in the non-display region, the photoelectric conversion transistor comprising a current output terminal;
the drive component is electrically connected to the plurality of pixels, and is electrically connected to the current output terminal of the photoelectric conversion transistor; and
the photoelectric conversion transistor comprises: an active layer, a first electrode and a second electrode that are overlapped with the active layer, and a gate insulated from the active layer,
wherein one of the first electrode and the second electrode is electrically connected to the current output terminal, and the active layer comprises a first portion that is in contact with the first electrode, a second portion that is in contact with the second electrode, and a channel portion disposed between the first portion and the second portion, wherein the channel portion comprises at least one strip-shaped sub-channel, and a total length of the at least one strip-shaped sub-channel is greater than a distance between the first electrode and the second electrode.

19. The display device according to claim 18, further comprising: a battery, wherein the battery is electrically connected to the current output terminal of the photoelectric conversion transistor and the drive component.

20. The display device according to claim 18, wherein the at least one strip-shaped sub-channel is extended along a non-linear direction;
the at least one strip-shaped sub-channel is extended along an extension direction of a fold line;
the first electrode comprises: a strip-shaped first sub-electrode and a plurality of strip-shaped second sub-electrodes, wherein one end of each of the plurality of second sub-electrodes is connected to the first sub-electrode; and
the second electrode comprises: a strip-shaped third sub-electrode and a plurality of strip-shaped fourth sub-electrodes, wherein one end of each of the plurality of fourth sub-electrodes is connected to the third sub-electrode, wherein the first sub-electrode, the second sub-electrodes, the third sub-electrode, and the fourth sub-electrodes are all overlapped with the active layer, the plurality of second sub-electrodes and the plurality of fourth sub-electrodes are all disposed between the first sub-electrode and the third sub-electrode, and the plurality of second sub-electrodes and the plurality of fourth sub-electrode are alternately distributed, and a length direction of the first sub-electrode is parallel to a length direction of the third sub-electrode, length directions of the plurality of second sub-electrodes are parallel to length directions of the plurality of fourth sub-electrodes, and the length direction of the first sub-electrode is perpendicular to the length direction of the second sub-electrode.

* * * * *